(12) United States Patent
Kato et al.

(10) Patent No.: US 10,330,170 B2
(45) Date of Patent: Jun. 25, 2019

(54) SHOCK ABSORBER

(71) Applicants: KYB Corporation, Tokyo (JP); TOYOTA JIDOSHA KABUSHIKI KAISHA, Aichi-ken (JP)

(72) Inventors: Hirohito Kato, Gifu (JP); Seiichiro Komatsu, Navarra (ES); Yuusuke Furuta, Gifu (JP); Hirofumi Morinaga, Miyoshi (JP)

(73) Assignees: KYB CORPORATION, Tokyo (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/536,125

(22) PCT Filed: Nov. 30, 2015

(86) PCT No.: PCT/JP2015/083579
§ 371 (c)(1),
(2) Date: Jun. 14, 2017

(87) PCT Pub. No.: WO2016/104060
PCT Pub. Date: Jun. 30, 2016

(65) Prior Publication Data
US 2017/0350464 A1 Dec. 7, 2017

(30) Foreign Application Priority Data
Dec. 26, 2014 (JP) .................................. 2014-264210

(51) Int. Cl.
*F16F 9/36* (2006.01)
*F16J 15/324* (2016.01)
*F16J 15/56* (2006.01)

(52) U.S. Cl.
CPC ................ *F16F 9/36* (2013.01); *F16F 9/363* (2013.01); *F16J 15/324* (2013.01); *F16J 15/56* (2013.01);
(Continued)

(58) Field of Classification Search
CPC ............................... F16F 9/364; F16F 9/3242
(Continued)

(56) References Cited

U.S. PATENT DOCUMENTS 4,482,036 A * 11/1984 Wossner ................. F16F 9/364
188/322.13
4,989,701 A * 2/1991 Yamaoka ................ F16F 9/364
188/315

(Continued)

FOREIGN PATENT DOCUMENTS

EP 0535409 A1 4/1993
EP 1956262 A1 8/2008
(Continued)

OTHER PUBLICATIONS

International Search Report in PCT/JP2015/083579, dated Dec. 28, 2015.

*Primary Examiner* — Christopher P Schwartz
(74) *Attorney, Agent, or Firm* — Hauptman Ham, LLP

(57) ABSTRACT

A rod guide includes a housing portion and a depressed portion formed toward an outer periphery from a starting point located apart from a piston rod by ½ or more of a distance in an axial direction between a bottom surface of the housing portion and a flat portion of an oil seal in a radial direction closest to the piston rod, and a bush is disposed to be flush with the bottom surface or disposed to project.

14 Claims, 4 Drawing Sheets

(52) U.S. Cl.
CPC ....... *F16F 2222/12* (2013.01); *F16F 2230/30* (2013.01); *F16F 2232/08* (2013.01)

(58) Field of Classification Search
USPC ................................ 188/315, 322.16–322.18
See application file for complete search history.

(56) References Cited

U.S. PATENT DOCUMENTS

| | | | | |
|---|---|---|---|---|
| 5,178,243 | A * | 1/1993 | Hamada | F16F 9/3242 188/315 |
| 5,363,945 | A * | 11/1994 | Lizell | F16F 9/364 188/281 |
| 6,896,110 | B2 * | 5/2005 | Vanmechelen | F16F 9/3242 188/322.17 |
| 7,793,584 | B2 * | 9/2010 | Murakami | F16F 9/364 188/322.17 |

FOREIGN PATENT DOCUMENTS

| | | |
|---|---|---|
| FR | 2739668 A1 | 4/1997 |
| JP | 2005-321020 A | 11/2005 |
| JP | 2012-117562 A | 6/2012 |

\* cited by examiner

SHOCK ABSORBER

RELATED APPLICATIONS

The present application is a National Phase of International Application No. PCT/JP2015/083579, filed Nov. 30, 2015, and claims priority based on Japanese Patent Application No. 2014-264210, filed Dec. 26, 2014.

TECHNICAL FIELD

The present invention relates to a shock absorber.

BACKGROUND ART

JP2005-321020A discloses a mono-tube type shock absorber that has a rod guide fitted onto an end portion of a cylinder for supporting a piston rod via a bush disposed on an inner periphery and an oil seal disposed on an opposite side of a liquid chamber of the rod guide for sealing between the piston rod and the cylinder.

The above-described shock absorber includes a housing portion in which a seal lip of the oil seal is housed, on a surface of the oil seal side of the rod guide.

SUMMARY OF INVENTION

In the above-described shock absorber, an end surface of the bush on the oil seal side disposed so as to be positioned lower than a bottom surface of the housing portion of the rod guide. That is, it is in a state where the rod guide and the bush form a circular groove on a peripheral area of the piston rod.

Such configuration makes contamination inside the housing portion easily accumulated on the peripheral area of the piston rod. Here, in extending of the shock absorber where the piston rod moves out of the cylinder, hydraulic oil is dragged by the piston rod due to a viscous resistance to be inserted into the seal lip of the oil seal. Then, in a state where the contamination is accumulated on the peripheral area of the piston rod, the contamination is inserted into the seal lip of the oil seal with the hydraulic oil, thus possibly decreasing a durability of the seal lip.

It is an object of the present invention to prevent the contamination from being accumulated on the peripheral area of the piston rod.

According to one aspect of the present invention, a shock absorber includes a cylinder in which a hydraulic fluid is sealed, a free piston slidably inserted into the cylinder, the free piston partitioning inside of the cylinder into a liquid chamber and a gas chamber, a piston slidably inserted into the cylinder, the piston partitioning the liquid chamber into an extension-side chamber and a contraction-side chamber, a piston rod inserted movably into and out of the cylinder, the piston rod being coupled to the piston, a rod guide fitted onto an end portion of the cylinder on the liquid chamber side, the rod guide slidably supporting the piston rod via a bush disposed on an inner periphery, and an oil seal disposed on an opposite side of the liquid chamber on the rod guide, the oil seal sealing between the piston rod and the cylinder, wherein the rod guide includes a housing portion disposed on a surface of the oil seal side, the oil seal including a seal lip housed in the housing portion, and a depressed portion depressed on a bottom surface of the housing portion, the depressed portion being formed toward an outer periphery from a starting point located apart from the piston rod by ½ or more of a distance in an axial direction between the bottom surface and a flat portion of the oil seal in a radial direction closest to the piston rod, wherein the bush is disposed to be flush with the bottom surface of the housing portion, or to project from the bottom surface.

DESCRIPTION OF EMBODIMENTS

Figure 1:
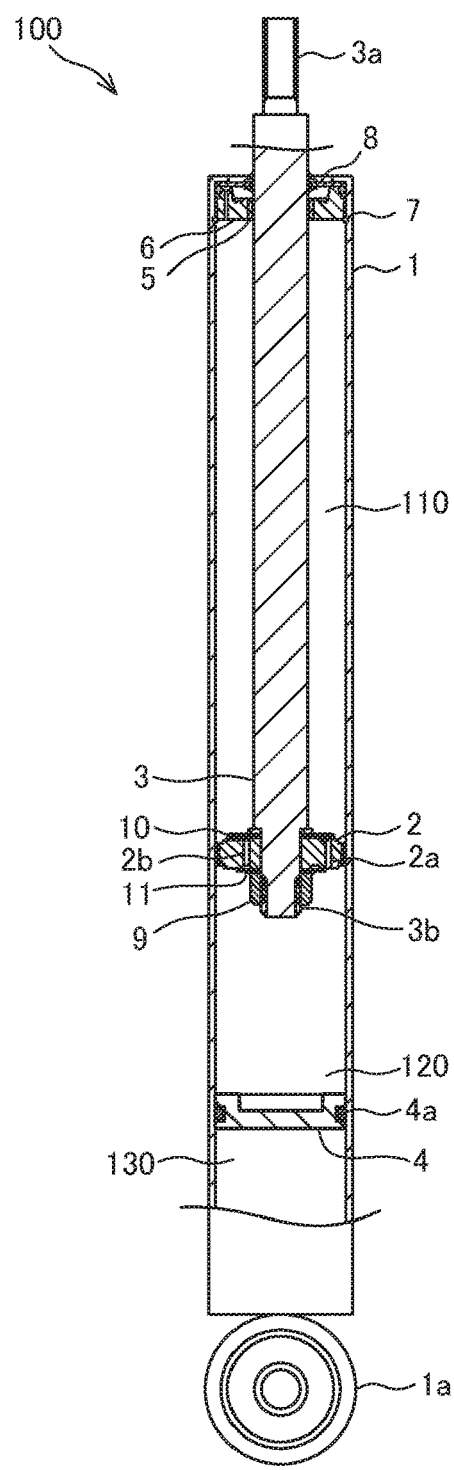
FIG. 1 is a partial cross-sectional view of a shock absorber according to an embodiment of the present invention.
Figure 2:
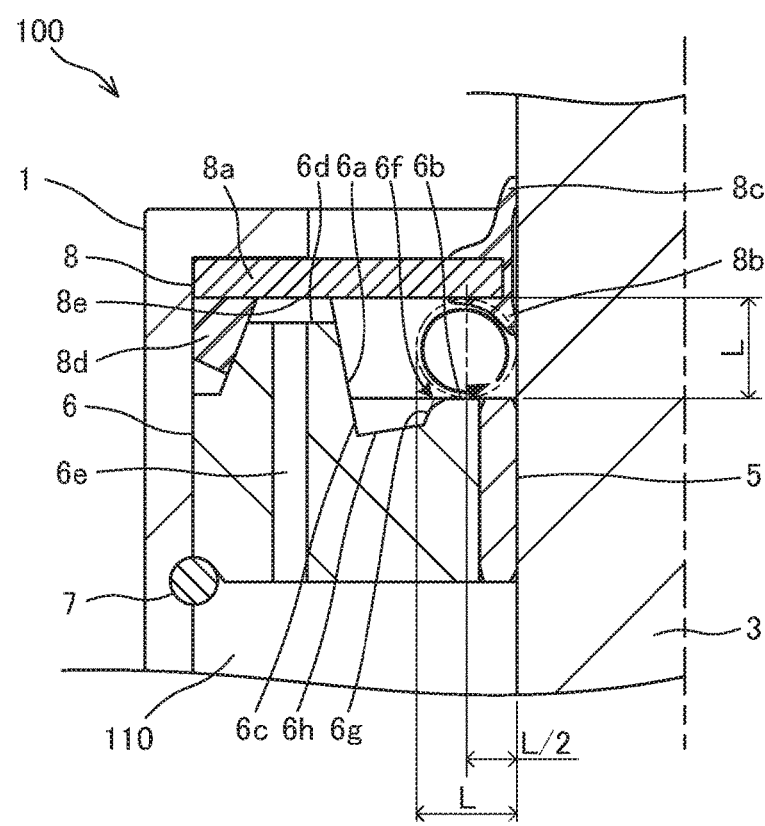
FIG. 2 is an enlarged view of a rod guide.

The following describes a shock absorber 100 according to an embodiment of the present invention by referring to FIG. 1 and FIG. 2.

The shock absorber 100 is a device interposed, for example, between a vehicle body and an axle shaft of a vehicle (not illustrated) for generating a damping force to reduce vibration of the vehicle body.

As illustrated in FIG. 1, the shock absorber 100 includes a cylinder 1, a circular piston 2 slidably inserted into the cylinder 1 for partitioning an inside of the cylinder 1 into an extension-side chamber 110 and a contraction-side chamber 120, and a piston rod 3 inserted movably into and out of the cylinder 1 to be coupled to the piston 2. The extension-side chamber 110 and the contraction-side chamber 120 are liquid chambers where hydraulic oil as a hydraulic fluid is sealed.

The shock absorber 100 is a mono-tube type shock absorber that includes a free piston 4 slidably inserted into the cylinder 1 to partition a gas chamber 130 inside the cylinder 1. The free piston 4 has an outer periphery on which a sealing member 4a is disposed to hold air tightness of the gas chamber 130.

The cylinder 1 has an end portion of the extension-side chamber 110 side where a circular rod guide 6 is fitted to slidably support the piston rod 3 via a bush 5 disposed on the inner periphery.

The rod guide 6 abuts on a retaining ring 7 disposed on the inner periphery of the cylinder 1 to specify a position in an axial direction. The rod guide 6 will be described later.

On an opposite side to the extension-side chamber 110 of the rod guide 6, an oil seal 8 is disposed.

As illustrated in FIG. 2, the oil seal 8 includes a circular base metal 8a, a seal lip 8b slidably in contact with the piston rod 3 to prevent the hydraulic oil from leaking outside, a dust lip 8c slidably in contact with the piston rod 3 to prevent foreign materials from being inserted into the cylinder 1, and an outer periphery seal 8d abutting on the inner periphery of the cylinder 1 to prevent the hydraulic oil from leaking outside. The seal lip 8b, the dust lip 8c, and the outer periphery seal 8d are vulcanized and bonded on the base metal 8a. It should be noted that a dust seal and an outer periphery seal may be disposed separately from the oil seal 8 such that the oil seal 8 does not include the dust lip 8c and the outer periphery seal 8d.

The rod guide 6 and the oil seal 8 are secured to the cylinder 1 by crimp processing where the end portion of the cylinder 1 is folded inside.

The cylinder 1 has the end portion on the gas chamber 130 side obstructed by a capping member (not illustrated). As illustrated in FIG. 1, on the end portion of the cylinder 1 on the gas chamber 130 side, a coupling member 1a is disposed for installing the shock absorber 100 on the vehicle. It should be noted that a plastic work may be performed to obstruct the end portion of the cylinder 1 on the gas chamber 130 side without disposing the capping member.

When the shock absorber 100 contracts to cause the piston rod 3 to move into the cylinder 1, a gas in the gas chamber 130 is compressed by a volume of the moving into of the piston rod 3, and the free piston 4 moves to the gas chamber 130 side. When the shock absorber 100 extends to cause the piston rod 3 to move out of the cylinder 1, the gas of the gas chamber 130 expands by the volume of the moving out of the piston rod 3, and the free piston 4 moves to the contraction-side chamber 120 side. This compensates for volume change in the cylinder 1 during the operation of the shock absorber 100.

The piston rod 3 includes an external thread 3a for installing the shock absorber 100 on the vehicle, on an end portion of a side where the piston rod 3 extends from the cylinder 1, and an external thread 3b with which a nut 9 screws, on an end portion of a side where the piston rod 3 is inserted into the cylinder 1.

The piston 2 includes passages 2a and 2b that communicate the extension-side chamber 110 with the contraction-side chamber 120. On the extension-side chamber 110 side of the piston 2, a damping valve 10 with a plurality of circular leaf valves is disposed. On the contraction-side chamber 120 side of the piston 2, a damping valve 11 with a plurality of circular leaf valves is disposed. The piston 2, the damping valve 10, and the damping valve 11 are secured to the end portion of the piston rod 3 by the nut 9.

When the shock absorber 100 contracts, the damping valve 10 is opened due to a pressure difference between the extension-side chamber 110 and the contraction-side chamber 120 to open the passage 2a, and provides resistance to a flow of the hydraulic oil moving from the contraction-side chamber 120 to the extension-side chamber 110 passing through the passage 2a. When the shock absorber 100 extends, the damping valve 10 obstructs the passage 2a.

When the shock absorber 100 extends, the damping valve 11 is opened to open the passage 2b, and provides resistance to a flow of the hydraulic oil moving from the extension-side chamber 110 to the contraction-side chamber 120 passing through the passage 2b. When the shock absorber 100 contracts, the damping valve 11 obstructs the passage 2b.

That is, the damping valve 10 is a damping force generating element when the shock absorber 100 contracts, and the damping valve 11 is a damping force generating element when the shock absorber 100 extends.

Subsequently, the rod guide 6 will be described.

As illustrated in FIG. 2, the rod guide 6 includes a housing portion 6a in which the seal lip 8b of the oil seal 8 is housed, disposed on a surface of the oil seal 8 side, and a depressed portion 6c disposed on a bottom surface 6b of the housing portion 6a. A plurality of the depressed portions 6c are disposed in a circumferential direction.

The inside of the housing portion 6a is communicated with the extension-side chamber 110 through a cutout 6d disposed on an abutting surface of the rod guide 6 on the oil seal 8, and a through-hole 6e opening to the cutout 6d and the extension-side chamber 110.

The depressed portion 6c has a side surface 6g on the piston rod 3 side disposed to be inclined toward a bottom portion 6h of the depressed portion 6c. The bottom portion 6h is disposed to be inclined toward an outer peripheral side of the rod guide 6. A corner portion of the bottom surface 6b and the depressed portion 6c has, as illustrated in FIG. 2, an R-chamfered shape on the piston rod 3 side.

The depressed portion 6c is disposed toward the outer peripheral side of the rod guide 6 having a position apart from the piston rod 3 by ½ or more of a distance L (equal to or more than L/2) between the bottom surface 6b and a flat portion 8e, as an abutting surface of the oil seal 8 on the rod guide 6 in a radial direction, in the axial direction as a starting point 6f. The starting point 6f is disposed so as to be positioned in a range to a position apart from the piston rod 3 by the distance L. It should be noted that, as illustrated in FIG. 2, the starting point 6f is a virtual intersection point of the bottom surface 6b and the side surface 6g.

The rod guide 6 has the inner periphery on which the bush 5 is disposed as described above. The bush 5 is pressed into the inner periphery of the rod guide 6 so as to be flush with the bottom surface 6b.

Subsequently, a description will be given of operational advantages of the shock absorber 100 configured as described above.

The contamination exists inside the shock absorber 100. Here, for example, when the end surface of the bush 5 on the oil seal 8 side is disposed so as to be positioned lower than the bottom surface 6b of the housing portion 6a of the rod guide 6, a ring groove is formed on the peripheral area of the piston rod 3. In such configuration, the contamination inside the housing portion 6a is easily accumulated on the peripheral area of the piston rod 3.

In extending of the shock absorber 100 where the piston rod 3 moves out of the cylinder 1, the hydraulic oil is dragged by the piston rod 3 due to a viscous resistance to be inserted into the seal lip 8b of the oil seal 8. Then, as described above, in a state where the contamination is accumulated on the peripheral area of the piston rod 3, the contamination is inserted into the seal lip 8b of the oil seal 8 with the hydraulic oil, thus possibly decreasing a durability of the seal lip 8b.

In contrast to this, in this embodiment, the bush 5 is disposed to be flush with the bottom surface 6b of the housing portion 6a. This makes it hard for the contamination to be accumulated on the peripheral area of the piston rod 3.

Furthermore, in this embodiment, the depressed portion 6c is disposed on the bottom surface 6b of the housing portion 6a, thus actively accumulating the contamination inside the housing portion 6a on the depressed portion 6c.

In extending of the shock absorber 100 where the piston rod 3 moves out of the cylinder 1, a vortex flow occurs inside the housing portion 6a in a direction indicated by an arrow in FIG. 2. In this embodiment, the vortex flow occurs in a range of a circle (two-dot chain line) being in contact with the piston rod 3 having the distance L between the bottom surface 6b of the rod guide 6 and the flat portion 8e of the oil seal 8 as a diameter.

On the piston rod 3 side with respect to the center of the vortex flow, the hydraulic oil flows from the rod guide 6 side toward the oil seal 8 side. On the outer peripheral side of the shock absorber 100 with respect to the center of the vortex flow, the hydraulic oil flows from the oil seal 8 side toward the rod guide 6 side.

Then, as described above, disposing the starting point 6f of the depressed portion 6c on the piston rod 3 side in a range from the position apart from the piston rod 3 by ½ of the distance L to the position apart from the piston rod 3 by the distance L causes the hydraulic oil to flow toward the depressed portion 6c. At this time, gravitation acts on the contamination mixed into the hydraulic oil to flow toward the depressed portion 6c, thus the contamination easily drops on the depressed portion 6c. Accordingly, the contamination is actively accumulated on the depressed portion 6c, thus ensuring the contamination inside the housing portion 6a to be separated from the piston rod 3.

It should be noted that, when the starting point 6f of the depressed portion 6c on the piston rod 3 side is disposed on the piston rod 3 side with respect to the position apart from the piston rod 3 by ½ of the distance L, the hydraulic oil flows so as to wind up the contamination from the depressed portion 6c, thus it is difficult to accumulate the contamination on the depressed portion 6c.

When the starting point 6f of the depressed portion 6c on the piston rod 3 side is disposed on the position apart from the piston rod 3 by equal to or more than the distance L, it is difficult to acquire the efficiency of the flow of the hydraulic oil toward the depressed portion 6c due to the vortex flow. However, even in this case, it ensures the contamination dropped on the depressed portion 6c to be prevented from wound up by the vortex flow. Accordingly, the contamination is accumulated on the depressed portion 6c, thus ensuring the contamination inside the housing portion 6a to be separated from the piston rod 3.

As described above, according to this embodiment, the bush 5 is disposed to be flush with the bottom surface 6b of the housing portion 6a, thus the contamination is hardly accumulated on the peripheral area of the piston rod 3. Since the starting point 6f of the depressed portion 6c on the piston rod 3 side is disposed in a range from the position apart from the piston rod 3 by ½ of the distance L to the position apart from the piston rod 3 by the distance L, it ensures the contamination inside the housing portion 6a to be actively accumulated on the depressed portion 6c. Accordingly, it prevents the contamination from being accumulated on the peripheral area of the piston rod 3, thus preventing the contamination from being inserted into the seal lip 8b during the extending of the shock absorber 100.

In this embodiment, the corner portion of the bottom surface 6b and the depressed portion 6c of the rod guide 6 has the R-chamfered shape on the piston rod 3 side such that the contamination on the peripheral area of the starting point 6f easily drops on the depressed portion 6c.

Disposing the side surface 6g of the depressed portion 6c on the piston rod 3 side to be inclined toward the bottom portion 6h causes the contamination dropped on the depressed portion 6c to promptly move to the bottom portion 6h so as to move away from the piston rod 3.

Disposing the bottom portion 6h of the depressed portion 6c to be inclined toward the outer peripheral side of the shock absorber 100 causes the contamination to be accumulated on the position more apart from the piston rod 3.

Now, the oil seal has various shapes. For example, an oil seal 12 illustrated in FIG. 3 includes a seal lip 12b largely projecting out to the rod guide 6 side compared with the oil seal 8 of the above embodiment.

In this case, a vortex flow occurs in a range of a circle (two-dot chain line) being in contact with a flat portion 12e of the oil seal 12, the seal lip 12b, and the bottom surface 6b of the housing portion 6a of the rod guide 6.

Accordingly, in this case, the starting point 6f of the depressed portion 6c on the piston rod 3 side is disposed in a range to a position of an outermost diameter of the circle being in contact with the flat portion 12e of the oil seal 12, the seal lip 12b, and the bottom surface 6b of the housing portion 6a of the rod guide 6 on the outer peripheral side of the rod guide 6, and the outer peripheral side with respect to a center of the circle, thus providing the efficiency similar to the above embodiment.

Figure 4:
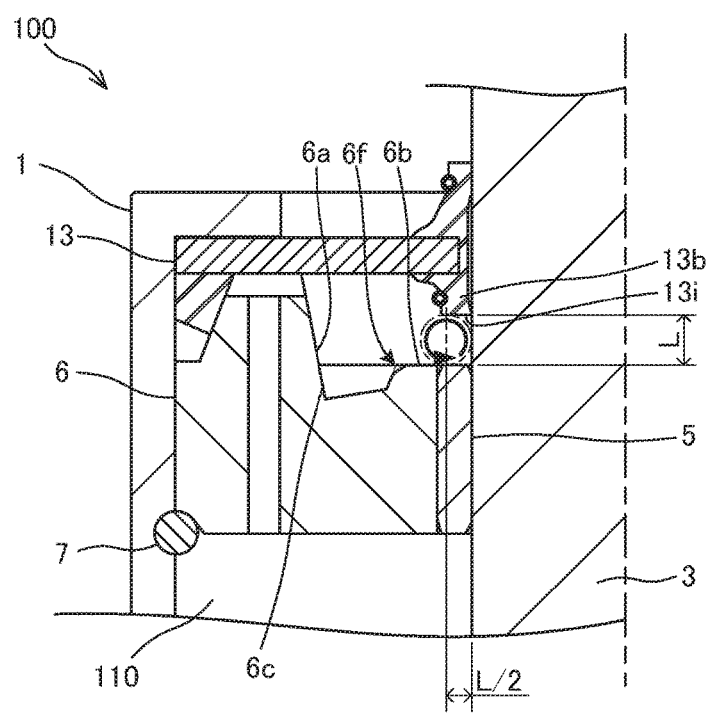
FIG. 4 is a view illustrating another modification of the oil seal.

Further, for example, an oil seal 13 illustrated in FIG. 4 includes a seal lip 13b that has an end surface 13i as a flat portion in the radial direction.

In this case, a vortex flow occurs in a range of a circle (two-dot chain line) that has a distance L between the bottom surface 6b of the housing portion 6a of the rod guide 6 and the end surface 13i of the seal lip 13b as a diameter and is in contact with the piston rod 3.

Accordingly, in this case, the starting point 6f of the depressed portion 6c on the piston rod 3 side is disposed on a position apart from the piston rod 3 by ½ or more of the distance L in the axial direction between the bottom surface 6b of the housing portion 6a and the end surface 13i of the seal lip 13b, thus preventing the contamination dropped on the depressed portion 6c from being wound up by the vortex flow.

Embodiments of the present invention were described above, but the above embodiments are merely examples of applications of the present invention, and the technical scope of the present invention is not limited to the specific constitutions of the above embodiments.

For example, while the bush 5 is disposed to be flush with the bottom surface 6b of the housing portion 6a in the above embodiment, the bush 5 may be disposed so as to project from the bottom surface 6b. In this case, similarly to the above embodiment, the contamination is hardly accumulated on the peripheral area of the piston rod 3.

While the plurality of the depressed portions 6c of the rod guide 6 are disposed in the circumferential direction in the above embodiment, the depressed portion 6c may be one. A circular groove may be disposed as the depressed portion 6c.

Figure 3:
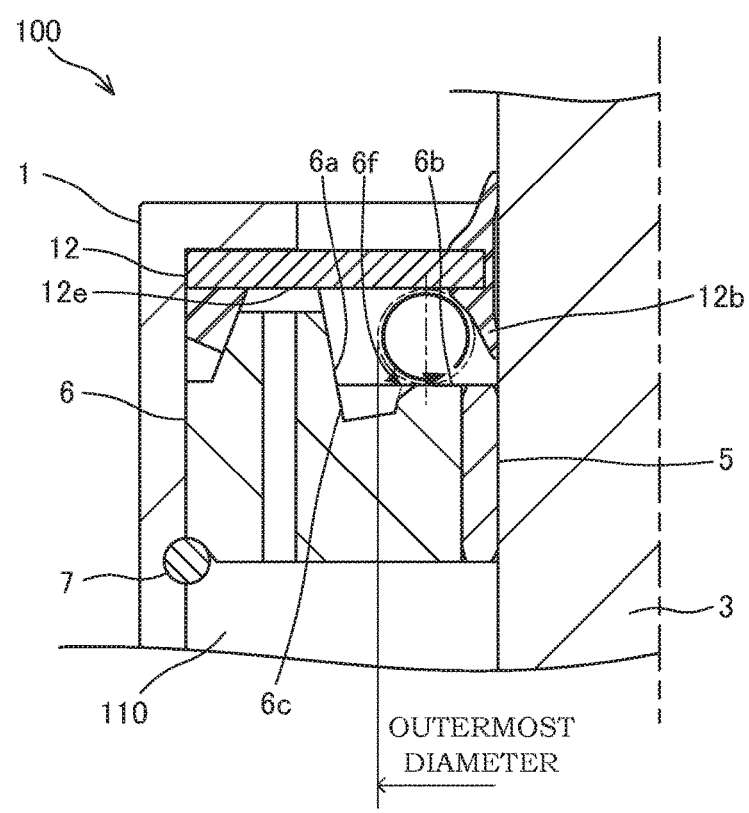
FIG. 3 is a view illustrating a modification of an oil seal.

While the corner portion of the bottom surface 6b and the depressed portion 6c of the rod guide 6 on the piston rod 3 side has the R-chamfered shape in the above embodiment, a C-chamfered shape may be employed as illustrated in FIG. 3. Even in this case, the efficiency similar to the case of the R-chamfered shape can be obtained.

While the hydraulic oil is used as an operating fluid in the above embodiment, the other liquid such as water may be used.

With respect to the above description, the contents of application No. 2014-264210, with a filing date of Dec. 26, 2014 in Japan, are incorporated herein by reference.

The invention claimed is:

1. A shock absorber, comprising:
a cylinder in which a hydraulic fluid is sealed;
a free piston slidably inserted into the cylinder, the free piston partitioning inside of the cylinder into a liquid chamber and a gas chamber;
a piston slidably inserted into the cylinder, the piston partitioning the liquid chamber into an extension-side chamber and a contraction-side chamber;
a piston rod inserted movably into and out of the cylinder, the piston rod being coupled to the piston;
a rod guide fitted onto an end portion of the cylinder on the liquid chamber side, the rod guide slidably supporting the piston rod via a bush disposed on an inner periphery; and
an oil seal disposed on an opposite side of the liquid chamber on the rod guide, the oil seal sealing between the piston rod and the cylinder, wherein:
the rod guide includes:
a housing portion disposed on a surface of the oil seal side, the oil seal including a seal lip housed in the housing portion; and
a depressed portion depressed on a bottom surface of the housing portion, the depressed portion being formed toward an outer periphery from a starting point located apart from the piston rod by ½ or more of a distance in an axial direction between the bottom surface and a flat portion of the oil seal in a radial direction closest to the piston rod, wherein the bush is disposed to be flush with the bottom surface of the housing portion, or to project from the bottom surface, and the rod guide has a corner portion of the bottom surface and the depressed portion formed in an R-chamfered shape on the piston rod side.

2. The shock absorber according to claim 1, wherein the starting point of the depressed portion of the housing portion is disposed on an outer peripheral side with respect to a center of a circle in contact with the flat portion of the oil seal, the seal lip, and the bottom surface of the housing portion.

3. The shock absorber according to claim 2, wherein the starting point of the depressed portion of the housing portion is disposed between
- a position apart from the piston rod by ½ of the distance between the bottom surface of the housing portion and the flat portion of the oil seal, and
- a position of an outermost diameter of the circle on the outer peripheral side, the circle being in contact with the flat portion of the oil seal, the seal lip, and the bottom surface of the housing portion.

4. The shock absorber according to claim 1, wherein the flat portion of the oil seal is an abutting surface on the rod guide.

5. The shock absorber according to claim 1, wherein the flat portion of the oil seal is an end surface of the seal lip.

6. The shock absorber according claim 1, wherein the starting point of the depressed portion of the housing portion is disposed between
- a position apart from the piston rod by ½ of the distance between the bottom surface of the housing portion and the flat portion of the oil seal, and
- a position apart from the piston rod by the distance between the bottom surface of the housing portion and the flat portion of the oil seal.

7. The shock absorber according to claim 1, wherein the shock absorber is a mono-tube type shock absorber.

8. A shock absorber, comprising:

a cylinder in which a hydraulic fluid is sealed;

a free piston slidably inserted into the cylinder, the free piston partitioning inside of the cylinder into a liquid chamber and a gas chamber;

a piston slidably inserted into the cylinder, the piston partitioning the liquid chamber into an extension-side chamber and a contraction-side chamber;

a piston rod inserted movably into and out of the cylinder, the piston rod being coupled to the piston;

a rod guide fitted onto an end portion of the cylinder on the liquid chamber side, the rod guide slidably supporting the piston rod via a bush disposed on an inner periphery; and an oil seal disposed on an opposite side of the liquid chamber on the rod guide, the oil seal sealing between the piston rod and the cylinder, wherein:

the rod guide includes:
- a housing portion disposed on a surface of the oil seal side, the oil seal including a seal lip housed in the housing portion; and
- a depressed portion depressed on a bottom surface of the housing portion, the depressed portion being formed toward an outer periphery from a starting point located apart from the piston rod by ½ or more of a distance in an axial direction between the bottom surface and a flat portion of the oil seal in a radial direction closest to the piston rod, wherein the bush is disposed to be flush with the bottom surface of the housing portion, or to project from the bottom surface, and the rod guide has a corner portion of the bottom surface and the depressed portion formed in a C-chamfered shape on the piston rod side.

9. The shock absorber according to claim 8, wherein the starting point of the depressed portion of the housing portion is disposed on an outer peripheral side with respect to a center of a circle in contact with the flat portion of the oil seal, the seal lip, and the bottom surface of the housing portion.

10. The shock absorber according to claim 9, wherein the starting point of the depressed portion of the housing portion is disposed between
- a position apart from the piston rod by ½ of the distance between the bottom surface of the housing portion and the flat portion of the oil seal, and
- a position of an outermost diameter of the circle on the outer peripheral side, the circle being in contact with the flat portion of the oil seal, the seal lip, and the bottom surface of the housing portion.

11. The shock absorber according to claim 8, wherein the flat portion of the oil seal is an abutting surface on the rod guide.

12. The shock absorber according to claim 8, wherein the flat portion of the oil seal is an end surface of the seal lip.

13. The shock absorber according to claim 8, wherein the starting point of the depressed portion of the housing portion is disposed between
- a position apart from the piston rod by ½ of the distance between the bottom surface of the housing portion and the flat portion of the oil seal, and
- a position apart from the piston rod by the distance between the bottom surface of the housing portion and the flat portion of the oil seal.

14. The shock absorber according to claim 8, wherein the shock absorber is a mono-tube type shock absorber.

* * * * *